US010041009B2

(12) United States Patent
Risbjerg Jarlkov

(10) Patent No.: US 10,041,009 B2
(45) Date of Patent: Aug. 7, 2018

(54) REACTOR COMPRISING OUTLET COLLECTOR WITH INSPECTION PORT

(71) Applicant: Haldor Topsøe A/S, Kgs. Lyngby (DK)

(72) Inventor: Klaus Risbjerg Jarlkov, Lyngby (DK)

(73) Assignee: Haldor Topsoe A/S, Lyngby (DK)

(*) Notice: Subject to any disclaimer, the term of this patent is extended or adjusted under 35 U.S.C. 154(b) by 0 days.

(21) Appl. No.: 15/316,891

(22) PCT Filed: Jun. 25, 2015

(86) PCT No.: PCT/EP2015/064398
§ 371 (c)(1),
(2) Date: Dec. 7, 2016

(87) PCT Pub. No.: WO2016/001059
PCT Pub. Date: Jan. 7, 2016

(65) Prior Publication Data
US 2017/0166820 A1     Jun. 15, 2017

(30) Foreign Application Priority Data
Jun. 30, 2014  (EP) .................................... 14174940

(51) Int. Cl.
*B01J 4/00*      (2006.01)
*C10G 45/02*     (2006.01)
*C10G 45/32*     (2006.01)
*C10G 45/44*     (2006.01)
*C10G 47/00*     (2006.01)

(52) U.S. Cl.
CPC ............ *C10G 45/02* (2013.01); *C10G 45/32* (2013.01); *C10G 45/44* (2013.01); *C10G 47/00* (2013.01); *C10G 2300/202* (2013.01)

(58) Field of Classification Search
CPC ........ C10G 45/02; C10G 47/00; C10G 45/32; C10G 45/44; C10G 2300/202
See application file for complete search history.

(56) References Cited

U.S. PATENT DOCUMENTS

| | | | |
|---|---|---|---|
| 5,401,471 A | 3/1995 | Scheler et al. | |
| 6,082,576 A * | 7/2000 | Counts-Bradley | B65D 39/04 220/787 |
| 2011/0056950 A1 | 3/2011 | Demoise, Jr. et al. | |

FOREIGN PATENT DOCUMENTS

| | | | |
|---|---|---|---|
| CN | 103111239 | * | 5/2013 |
| CN | 103111239 A | | 5/2013 |
| DE | 20 2006 012 549 U1 | | 11/2006 |
| EP | 1 249 272 A1 | | 10/2002 |
| GB | 2 158 733 A | | 11/1985 |

* cited by examiner

*Primary Examiner* — Randy Boyer
*Assistant Examiner* — Juan C Valencia
(74) *Attorney, Agent, or Firm* — Blank Rome LLP

(57) ABSTRACT

A reactor comprising an outlet collector with an inspection port for easy maintenance and service.

12 Claims, 3 Drawing Sheets

REACTOR COMPRISING OUTLET
COLLECTOR WITH INSPECTION PORT

FIELD OF THE INVENTION

This invention relates to a chemical reactor with an outlet collector. Specifically the reactor has an outlet collector comprising an inspection port for maintenance, cleaning and removal of deposits. The reactor can be a down-flow catalytic reactor which includes vertically superimposed packed beds of particulate catalytic material. This type of reactor is used in the petroleum and chemical processing industries for carrying out various catalytic reactions, such as sulphur and nitrogen conversion (HDS/HDN); hydrogenation of: olefins (HYD) and aromatics (hydrodearomatisation—HDA), metals removal (hydrodemetallisation—HDM), oxygen conversion (hydrodeoxygenation—HDO) and hydrocracking (HC). Alternatively, the reactor is a radial converter, where elements of the decks have to be fixed to the reactor. This reactor has a radial flow crossing a packed bed of catalytic material and it is typically used in the petroleum and chemical processing industries for carrying out catalytic reactions such catalytic reforming and ammonia synthesis.

BACKGROUND OF THE INVENTION

Hydroprocessing is any process for treating a feedstock with hydrogen. Hydroprocessing may include hydrocracking, which is a process for converting of heavy oil fractions to light oil fractions, HDS/HDN, HYD, HAD, HDM, and HDO. Hydroprocessing is taking place in a hydroprocessing catalytic reactor which is the key element of a hydroprocessing unit. Hydroprocessing catalytic reactors can have single or multiple catalyst beds. Which of the options will be chosen for a particular reactor depends on the amount of catalyst is required for conversion of the feed to the product with desired properties. Most of the hydroprocessing reactions are exothermic and heat is developed as feed is passing through the catalyst bed. In order not to expose the catalyst to higher temperatures than required, and consequently to accelerate deactivation of the catalyst, the required volume of catalyst is divided into a number of beds with cooling zones (quench sections) installed between the beds. In a radial converter, the deck of the reactor ensures that the gas flow is collected along the perimeter of the reactor prior admission to the catalyst containing section.

Due to the installation, un-installation and maintenance requirements, as well as cleaning of elements of the reactor, it is crucial to provide full access to any of the reactor elements. Outlet collectors in hydroprocessing reactors are used to collect gas and liquid at the bottom of the reactors and convey them to further processing via the outlet pipe. As the reactor is filled with catalyst, solid debris, either generated from catalyst comminution or transported with the feed stocks, may enter the outlet collector. Such debris may deposit in the outlet collector or in the outlet pipe creating increased pressure drop. Furthermore, it may be conveyed to other unit operations of the hydroprocessing unit causing adverse effect on performances of such unit operations, failure and damages to the units.

During maintenance the outlet collector and the outlet pipe need to be inspected and any debris needs to be removed. In the art, the preferred method for inspection is the removal of the outlet collector, as one piece of equipment. This is done by unfastening fixing clams and lifting the collector. Large collectors are lifted by the use of cranes. This method for accessing the outlet collector and the outlet pipe is time consuming, due to the use of tools and the crane, thereby increasing the time an operator spends in a confined space. Furthermore, it exposes the operators to a higher risk because of lifting of heavy pieces of equipment in constrained space and the use of the crane.

EP0075056 describes an ammonia synthesis system which uses at least one ammonia converter characterized by a simplified split axial flow design. An outlet collector is shown at the bottom of the converter.

CN201832617U relates to a reactor outlet collector, which is arranged on the inner side of a bottom seal head of a reactor and comprises a top cover, a cylinder and support plates. The top cover is arranged on the cylinder and covers the cylinder, the side face of the cylinder is provided with a plurality of support plates, the support plates are connected with a fixing plate through fasteners, the fixing plate is welded on the bottom seal head of the reactor, and thus the reactor outlet collector is fixed on the reactor. A positioning ring is arranged on the sidewall of the bottom seal head of the reactor and is connected with the lower end of the cylinder of the reactor outlet collector. Compared with the prior art, the utility model has the advantages that the reactor outlet collector has a simple structure, small pressure drop and smooth channels, is easy to install and the like.

CN103111239 describes a reactor comprising a cylinder, an upper seal head packaged at the top of the cylinder and a lower seal head packaged at the bottom of the cylinder, the cylinder, the upper seal head and the lower seal head form a closed cavity, reaction tubes are arranged in the cavity, the top of each of the reaction tubes is inserted to a mixed gas tank, the middle of each of the reaction tubes is inserted to a tube support, and the bottom of each of the reaction tubes is inserted to a tube plate; tube supports are fixed on the reaction tubes, the bottom of the tube plate is fixed at the top of a U-shaped cylinder, the bottom of the U-shaped cylinder is fixed on a branch tube, the bottom of the branch tube is inserted to a manifold trunk, the top of a distribution tube is inserted to the manifold trunk, the bottom of the distribution is positioned outside the manifold trunk, and the bottom of an adaptor penetrates through the lower seal head; the top of the upper seal head is provided with a work starting gas inlet; and the bottom of the lower seal head is provided with an outlet collector, and the bottom of the outlet collector is provided with a generated gas outlet. The reactor has the advantages of methanol output improvement, cost reduction, energy saving and energy consumption reduction.

CN201493096 discloses a collector for an outlet comprising a cylinder; a porous cover plate is arranged at the top end of the cylinder; uniformly distributed strip-shaped holes are axially and annularly arranged on the cylinder; a plurality of reinforcing ribs are axially and symmetrically fixed on the inner wall of the cylinder; the outer walls of the porous cover plate and the cylinder are covered with a metal grid; and the metal grid is formed by welding a plurality of support bars and grid bars perpendicular to the support bars. The collector has the advantages of simple structure, convenient installation, strong carrying capacity and the like and is mounted in a reactor, thereby fully blocking catalysts and impurities and better supporting the weight of the catalysts; and the collector is used for a long time and is not easy to block a net, so that the service life is longer.

Despite the above mentioned known art, a need exists for a reactor with an outlet collector comprising an inspection port for easy, cheap, quick and convenient maintenance, cleaning and removal of deposits of the outlet collector and of the outlet pipe.

SUMMARY OF THE INVENTION

The present invention provides a catalytic reactor with an outlet collector equipped with an inspection port. The size of the inspection port has to be such that the operator can introduce inspection tools, or at least parts of inspection tools, throughout the outlet collector and through the outlet pipe which is connected to the outlet of the outlet collector. Additionally, the port is sufficiently wide to allow accessing the outlet collector with cleaning equipment or at least parts of cleaning equipment for the removal of accumulated dirt. The port may be, but does not need to be, sufficiently wide to allow the passage of the operator through it.

The outlet collector of this invention includes a cover closing the port. The outlet collector being subject to significant pressure drops (up to 20 bar, typically 7 bar), the cover is designed such to ensure that the outlet collector does not collapse under operations or during transients (largest pressure drop is often during emergency shut down).

The cover of the outlet collector of this invention comprises a disc, that seals the port, and a cylindrical body, having the function to prevent the outlet collector from collapsing.

Once the cover is closed, the external side of the cover body comes in contact with the compression ring that surrounds the opening of the outlet collector. The design of the compression ring has to ensure tight fit with the cover body when the equipment is subject to pressure differences and/or it is hot and a sufficiently lose fit when the equipment is exposed to ambient temperature and pressure, so that the cover can be easily removed during maintenance. The maximum gap between the external side of the cover body and the external side of the compression ring is often 1-2.5 mm.

The external diameter of the cover body is dimensioned such that the opening allows at least inserting and operating inspection and cleaning tools, or part of tools, through the opening. The design of the diameter and the thickness of the cover body are also subject to strength considerations due to the function of the cover to prevent collapse of the outlet collector.

The cover disc may be in a thickness of 10-20 mm. The cover may be designed in one or several pieces. The maximum size of each part is designed under considerations of typical handling procedures, with regards to maintenance. For example, considerations of the size of the man ways of the equipment above and maximum weight of each part are accounted for.

The bottom side of the cover disc may comprise strengthening structures that impart the necessary strength to the disc and the body to withstand the pressure drop. In one embodiment, the strengthening structures are eight beams arranged in ray pattern from the center of the cover.

The cover disc is fastened to the outlet collector by a few fixing points. In one embodiment, the system only comprises two fixing points. The fastening system may include, but is not limited to, quick releases or a combination of a rail-slider interlock systems and quick releases. The cover disc can include a bar, which may also be used as a handle.

Inspection of the outlet pipe is a necessary operation to avoid that dirt, for example as catalyst debris, does not accumulate at the exit of the reactor and is not lead to the downstream equipment.

The common method of performing inspection is to remove the whole outlet collector. This is typically fastened to the reactor by a large number of fixing point, typically bolted. During operation, screws and bolts may seize and unfastening the outlet collector is a lengthy operation that often requires metal cutting and welding for reparations. The outlet collectors known in the art are heavy structures that require a crane to be lifted. Crane time adds additional down-time to the operations.

By means of the present invention, inspection and cleaning may be executed simply by the removal of the inspection port. In one embodiment, this requires only two fixing points (preferably Quick Release) and the inspection port may be lifted manually. The invention allows considerable savings in time and complexity of the operations. The most important benefits are financial for the plant owner (shorter down-time) and safety for the operators, which are subject to much shorter time periods working in confined spaces.

FEATURES OF THE INVENTION

1. Catalytic reactor for chemical reactions, comprising an outlet collector for collecting and conveying of fluid from the chemical reactions to further processing, wherein said outlet collector comprises an aperture for receiving an inspection port and an inspection port, for maintenance and cleaning of the outlet collector.

2. Catalytic reactor according to feature 1, wherein the weight of said inspection port is small enough to enable manual mounting and de-mounting of the inspection port in the outlet collector.

3. Catalytic reactor according to any of the preceding features, wherein the weight of said inspection port is in the range of 2-80 kg, preferably in the range of 4-40 kg.

4. Catalytic reactor according to any of the preceding features, wherein said inspection port is large enough to enable passing and operation of inspection and cleaning tools.

5. Catalytic reactor according to any of the preceding features, wherein said inspection port is large enough to enable the passage of a person.

6. Catalytic reactor according to any of the preceding features, wherein said inspection port is cylindrical and has a diameter in the range of 100-1200 mm, preferably in the range of 250-600 mm.

7. Catalytic reactor according to any of the preceding features, wherein said inspection port comprises a cylindrical body, a disc shaped cover and strengthening structures.

8. Catalytic reactor according to any of the preceding features, wherein said inspection port comprises strengthening structures in the shape of beams fixed in a ray pattern, a line pattern or a square pattern.

9. Catalytic reactor according to any of the preceding features, wherein said inspection port is strong enough to withhold a pressure difference between two sides of the port in the range of 0-50 barg, preferably in the range of 0-20 barg.

10. Catalytic reactor according to any of the preceding features, wherein said inspection port comprises a locking bar for fixing the inspection port to the outlet collector, preferably the bar also functions as a handle for mounting and de-mounting of the inspection port.

11. Catalytic reactor according to any of the preceding features, wherein said inspection port is fixed to the outlet collector in one or a plurality of fixing points, preferably two fixing points by fixing means.

12. Catalytic reactor according to feature 11, wherein the fixing means is a quick release element.

13. Catalytic reactor according to any of the preceding features 11 or 12, wherein the fixing means is a screw and nut element, a screw and wing nut element, a knee joint element or a wedge element or any of the mentioned elements in combination with a keyhole and bolt element.

14. Catalytic reactor according to any of the preceding features, wherein the outlet collector comprises compression ring surrounding the aperture, said compression ring is adapted to contact the inspection port when the inspection port is mounted in the outlet collector, the compression ring is constructed to provide a tight fit with the inspection port when the catalytic reactor is in operation and to provide a loose fit when the catalytic reactor is not in operation.

15. Catalytic reactor according to feature 14, wherein a gap between the compression ring and the inspection port is in the range of 0.5-5 mm, preferably in the range of 1-2.5 mm when the reactor is not in operation.

16. Use of a catalytic reactor comprising an outlet collector and an inspection port according to any of the preceding features for hydroprocessing.

BRIEF DESCRIPTION OF THE DRAWINGS

The invention is further illustrated by the accompanying drawings showing examples of embodiments of the invention.

POSITION NUMBERS

01. Outlet collector.
02. Aperture.
03. Inspection port.
04. Cylindrical body.
05. Disc shaped cover.
06. Strengthening structures.
07. Locking bar.
08. Fixing points.
09. Fixing means.
10. Compression ring.

DESCRIPTION OF THE DRAWINGS

A number of embodiments of the invention will be explained in more detail in the following with reference to the drawings.

Figure 1:
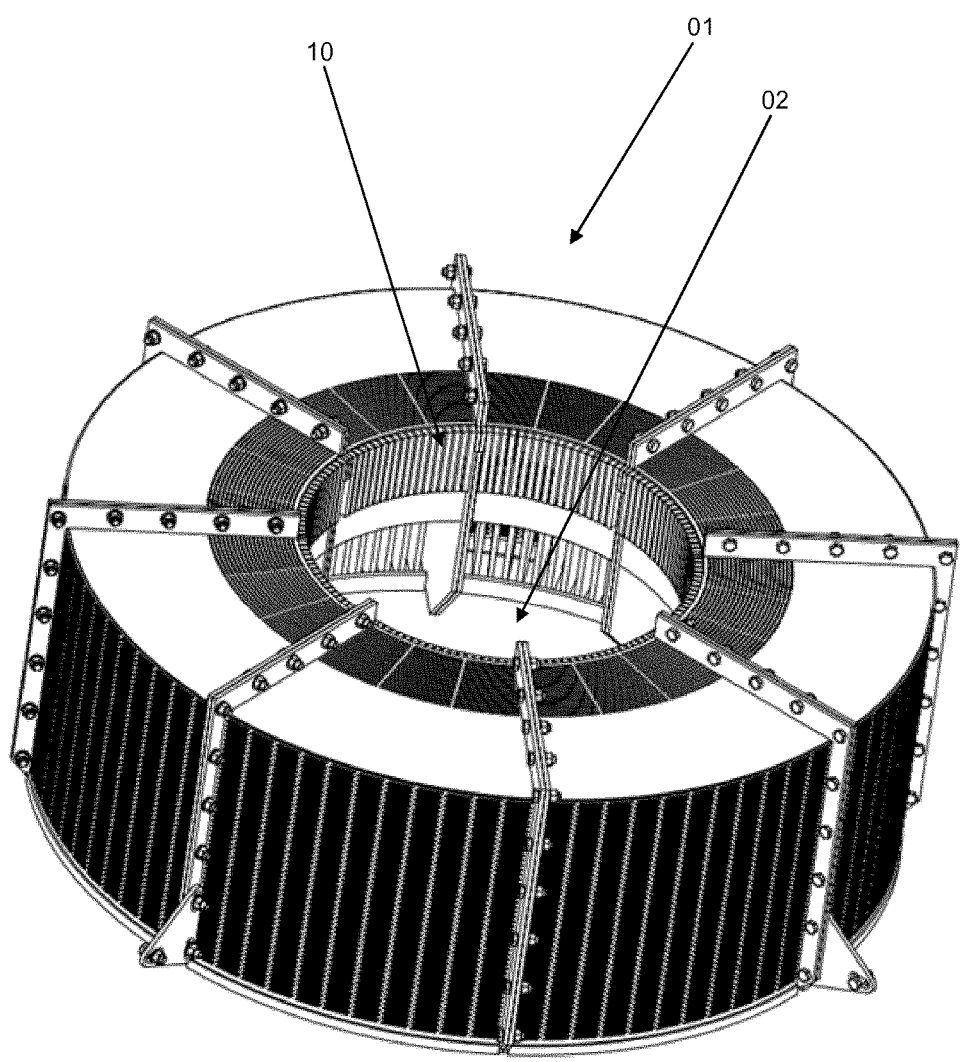
FIG. 1 shows an isometric view of an outlet collector with an aperture for an inspection port for a reactor (not shown) according to the invention.

In FIG. 1 an outlet collector 01 for a reactor (not shown) according to the invention is shown. The outlet collector is mounted in the bottom of the reactor where it functions as a gas and/or liquid collector. From the outlet collector, the fluids are conveyed to further processing via an outlet pipe (not shown). The outlet collector in the present embodiment has a cylindrical shape. In a first end of the outlet collector, an aperture 02 is adapted to receive an inspection port. The inner side of the aperture has a compression ring 10 with a an inner diameter adapted to provide a loose fit with the inspection port when the reactor is not in operation and a tight fit when the reactor under operation is subject to operation pressure and temperature. The operation pressure may be around 20 bars, but typically around 7 bar.

Figure 2:
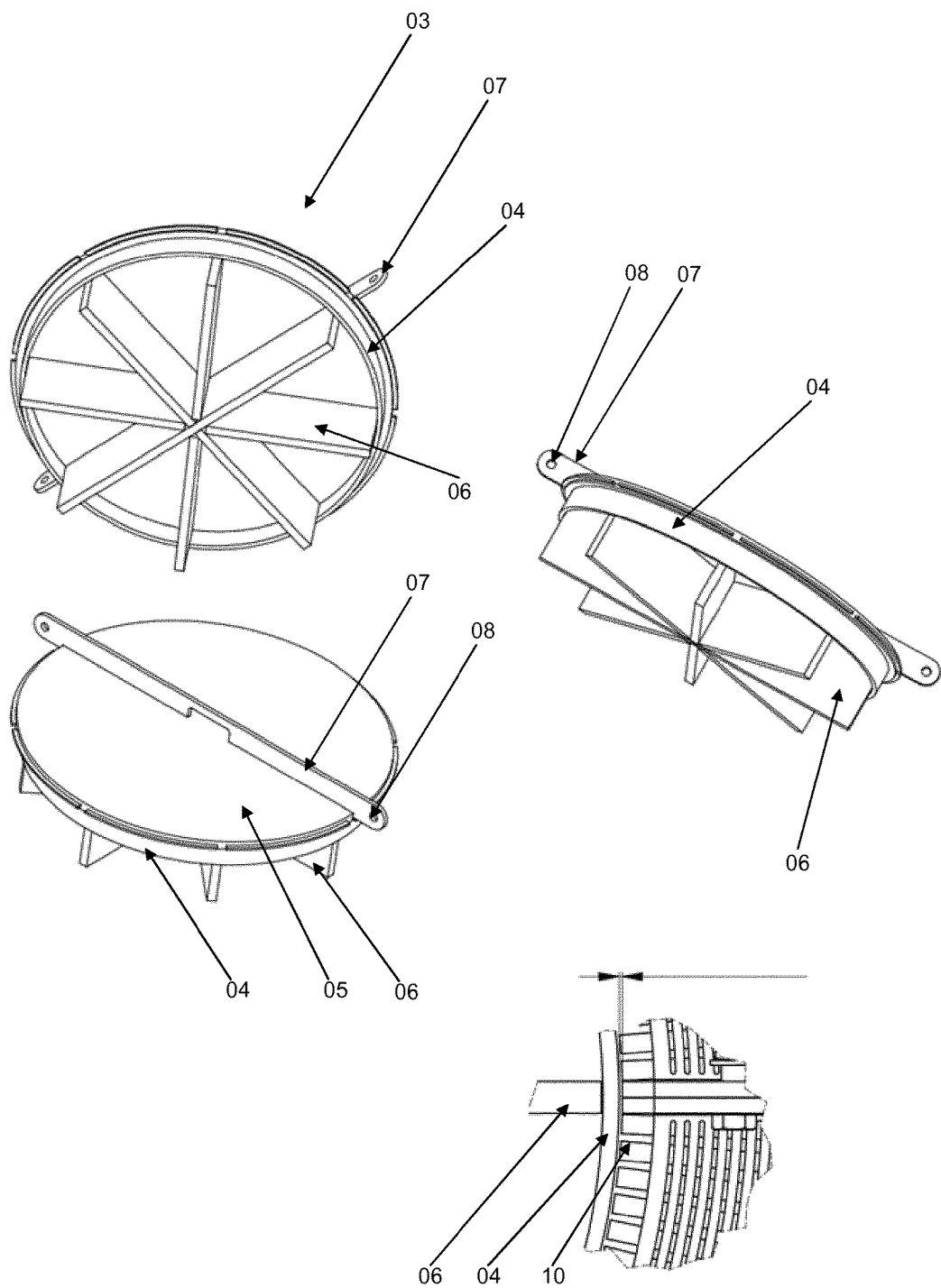
FIG. 2 shows isometric views of an inspection port for an outlet collector (not shown) in a reactor (not shown) according to the invention and a detail view of the gap between the inspection port and the outlet collector.

The inspection port 03 which is adapted to be mounted in the outlet collector is shown on FIG. 2. It comprises a cylindrical body 04 which provides structural strength to the inspection port and has an outer diameter which is modified to fit inside the aperture of the outlet collector as described above. A disc shaped cover 05 provides closure of the aperture of the outlet collector when the inspection port is mounted. The disc shaped cover has a thickness and strength adapted to withstand operation pressures and temperatures. To provide additional strength and optionally to save weight, the inspection port of this embodiment is further provided with strengthening structures 06 which are mounted below the disc shaped cover, contacting and supporting it. As shown on FIG. 2, the strengthening structures may be steel bars mounted in a ray pattern, welded together, to the cylindrical body and to the disc shaped cover. On the upper side of the disc shaped cover, opposite the strengthening structures, a locking bar 07 is mounted. It is mounted aligned with the diameter of the disc shaped cover, extending beyond the rim of the disc shaped cover, enough to provide for fixing points 08 adapted to be fixed to counterpart fixing points on the outlet collector. The fixing points of the present embodiment are two apertures, one in each end of the locking bar. As seen on FIG. 2, the locking bar has in its middle section a cut big enough to the passing of one or two hands, for a person's handling of the inspection port. In this way the locking bar serves also as a handle. In the lower part of FIG. 2, a detail picture shows the gap between the cylindrical body of the inspection port and the compression ring of the outlet collector. This gap is between 1 and 2.5 mm when the reactor, outlet collector and inspection port is subject to ambient temperature and pressure, but narrows toward 0 when the reactor, outlet collector and inspection port is subject to operation pressure and temperature.

Figure 3:
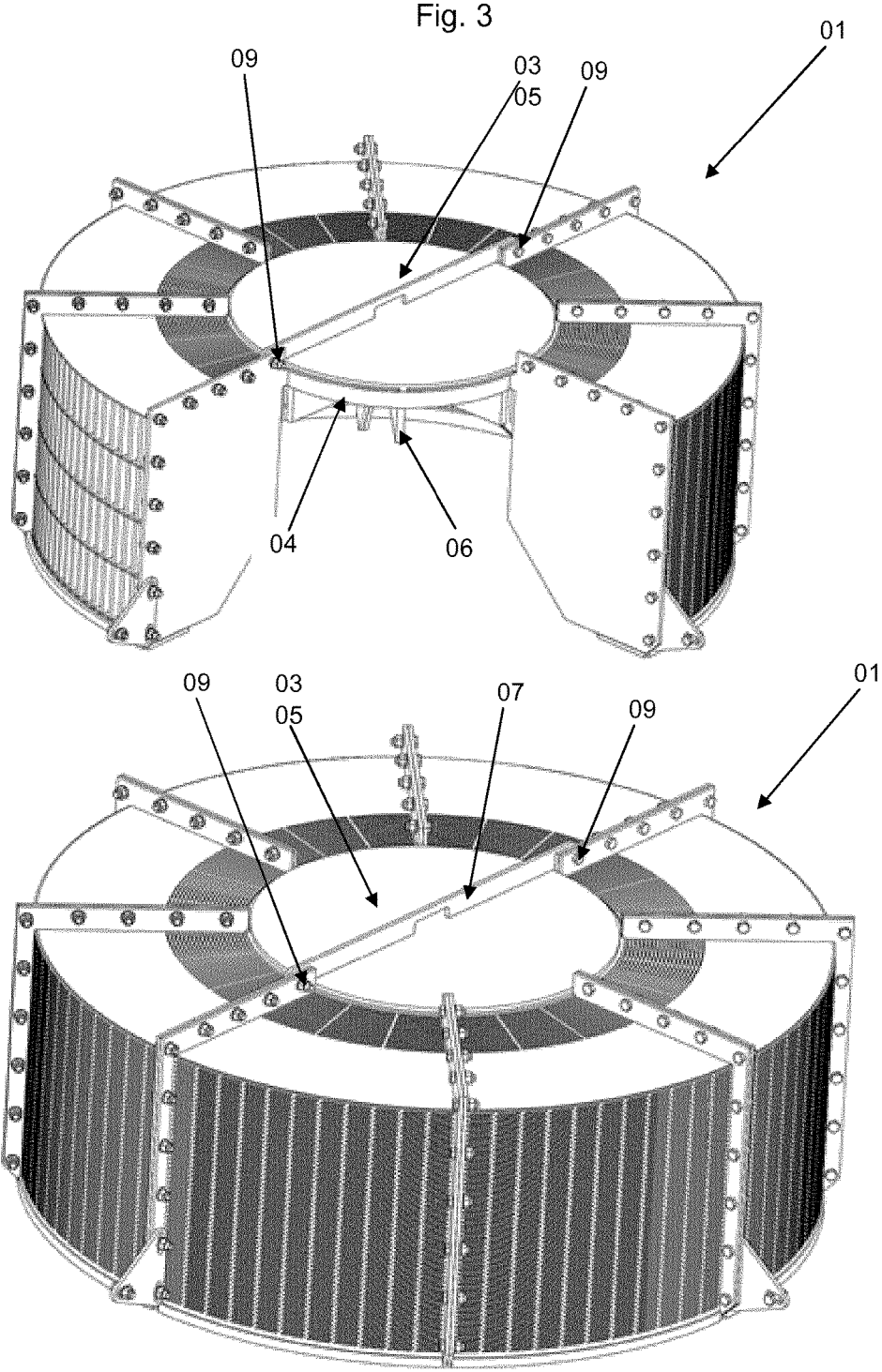
FIG. 3 shows isometric views of the inspection port installed in the outlet collector for a reactor (not shown) according to the invention; one view is a cut view of the outlet collector.

FIG. 3 shows the inspection port mounted in the outlet collector, the upper view shows the outlet collector in a cut view to visualize the inner part of the outlet collector with the inspection port mounted. As seen in both the upper and the lower view, this embodiment uses simple bolts as fixing means 09, just two bolts are sufficient to secure the inspection port in its mounted position. Thus the present invention ensures a quick and easy mounting and de-mounting of the inspection port and therefore a quick and easy maintenance and inspection of the outlet collector and the connected outlet pipe.

The invention claimed is:

1. An outlet collector for collecting fluid from chemical reactions in a catalytic reactor and conveying the fluid to further processing, wherein said outlet collector comprises an aperture, and an inspection port received in the aperture, for maintenance and cleaning of the outlet collector, wherein said inspection port comprises:
a cylindrical body;
a disc shaped cover;
a plurality of strengthening beams disposed below the cover in a ray pattern, a line pattern or a square pattern, and;
a locking bar for fixing the inspection port to the outlet collector, the locking bar being disposed on the upper side of the disc shaped cover and being aligned with, and extending across, a diameter of a rim of the disc shaped cover, wherein the locking bar also functions as a handle for mounting and de-mounting of the inspection port, the locking bar including portions extending radially outwardly beyond the rim of the disc shaped cover on opposite sides, the radially outwardly extending portions of the locking bar each including a fixing point adapted to be fixed to a corresponding fixing point on the outlet collector.

2. The outlet collector according to claim 1, wherein the weight of said inspection port is small enough to enable manual mounting and de-mounting of the inspection port in the outlet collector.

3. The outlet collector according to claim 1, wherein the weight of said inspection port is in the range of 2-80 kg.

4. The outlet collector according to claim 1, wherein said inspection port is large enough to enable passing and operation of inspection and cleaning tools.

5. The outlet collector according to claim 1, wherein said inspection port is large enough to enable the passage of a person.

6. The outlet collector according to claim 1, wherein said inspection port is cylindrical and has a diameter in the range of 100-1200 mm.

7. The outlet collector according to claim 1, wherein said inspection port is strong enough to withhold a pressure difference between two sides of the port in the range of 0-50 bars.

8. The outlet collector according to claim 1, wherein said inspection port is fixed to the outlet collector at said fixing points by fixing means.

9. The outlet collector according to claim 8, wherein the fixing means is a quick release element.

10. The outlet collector according to claim 8, wherein the fixing means is a screw and nut element, a screw and wing nut element, a knee joint element or a wedge element or any of the mentioned elements in combination with a keyhole and bolt element.

11. The outlet collector according to claim 1, wherein the outlet collector comprises compression ring surrounding the aperture, said compression ring is adapted to contact the inspection port when the inspection port is mounted in the outlet collector, the compression ring is constructed to provide a tight fit with the inspection port when the catalytic reactor is in operation and to provide a loose fit when the catalytic reactor is not in operation.

12. The outlet collector according to claim 11, wherein a gap between the compression ring and the inspection port is in the range of 0.5-5 mm when the reactor is not in operation.

* * * * *